United States Patent Office 2,859,107
Patented Nov. 4, 1958

2,859,107

METHOD OF RECOVERING VANADIUM FROM VANADIUM-CONTAINING IRON ORES

Nils H. Brundin, Hoganas, and Gustav Edvard Henry Landberg, Gavle, Sweden, assignors to Höganäs-Billesholms Aktiebolag, Hoganas, Sweden, a company of Sweden No Drawing. Application October 4, 1954
Serial No. 460,231

3 Claims. (Cl. 75—108)

This invention relates to a method of pretreating magnetite iron ore having a low content of vanadium, i. e. below about 2 percent counted as $V_2O_5$ in order to extract its vanadium values with a high yield while maintaining the iron ore in lumps or briquettes of such strength that they, directly after extraction of the vanadium values and possibly drying, can be utilized for charging a reduction furnace, e. g. a blast furnace.

For this purpose it has been suggested in a co-pending application Ser. No. 237,295, filed July 17, 1951, in the name of Otto F. F. Barth and assigned to Hoganas-Billesholms Aktiebolag of Hoganas, Sweden, to mix vanadium containing iron ore concentrate with sodium carbonate and to sinter such mixture at a temperature of at least 1100° C. for the production of lumps of a size suitable for charging a blast furnace and to leach said lumps with water. The sintering, of course, must be carried out under oxidizing condition so that the vanadium values are converted into water extractable sodium vanadate.

This previously suggested method has a certain disadvantage in that sodium carbonate does not only convert the vanadium values but also other substances of the ore such as compounds of aluminum, silicon, phosphorus, and chromium into water soluble products thereby increasing the consumption of sodium carbonate and making necessary a special purification of the extract in order to obtain a high grade vanadium product.

The main purpose of this invention is to find a more selective and simultaneously less expensive medium for the conversion of the vanadium values of vanadium-containing iron ores into water soluble vanadate which could replace sodium carbonate in the process of the above mentioned application Ser. No. 237,295.

These purposes it has now been found can be obtained by utilizing sodium sulfate instead of sodium carbonate.

When considering the use of a sulfate addition to iron ores before sintering this would certainly, by those skilled in the art, be regarded as inadvisable with regard to the risk of sulfur impuring the iron ore. However, in trials it has turned out that by the treatment according to this invention the sulfur content of the leached lumps can be kept as low as below 0.1 percent.

The method according to the invention is suitably carried out in such a way that the ore in the form of concentrate or relatively small lumps is mixed with sodium sulfate and heated at a temperature of at least 1000° C. for such a period of time that at least the main part of its vanadium content is converted to a form which is leachable with water. The material is then cooled and leached with water after which vanadium is precipitated out of the leach solution in a common way. This can be done in such a way that the alkaline solution containing sodium vanadate is acidified to a suitable pH for precipitation of vanadium as vanadium pentoxide. If sulfuric acid is used for the precipitation the invention will give the further advantage that sodium sulfate can be recovered from the solution after precipitation of vanadium pentoxide and separation of the vanadium pentoxide from the solution.

As already stated the heating temperatures shall be at least 1000° C. However the conversion is more rapid and more complete at higher temperatures. Trials have shown that when using vanadium-containing magnetite ores as starting material the heating should be performed at temperatures of about 1100–1300° C., and suitably at about 1200° C. in order to give a practically complete conversion in reasonably short time.

If desired, the ore is first crushed and concentrated magnetically or in other known ways, e. g. by flotation. The concentrate is mixed with sodium sulfate, which if desired but not necessarily can be calcined, and the mixture is then subjected to the heating. When using comminuted ore concentrate it is also possible to make briquettes of the mixture with sodium sulfate and to sinter such briquettes in the temperature range stated above since trials have shown that the vanadium content can be practically completely leached out with water even from such sintered briquettes.

The amount of sodium sulfate intermingled in the ore should be somewhat higher than the stoichiometrical amount counted on the vanadium content and should suitably be about 1.5 times the stoichiometrically calculated amount.

*Example.*—3 kg. of a magnetite iron ore containing vanadium oxides in an amount corresponding to 1.15% calculated as $V_2O_5$ were crushed to minus 100 mesh and then mixed with 150 g. calcined sodium sulfate. The mixture was formed to briquettes of the size of bricks for building purposes and sintered at 1150° C. After cooling the briquettes were leached with water and vanadium was precipitated by the addition of hydrochloric acid. The precipitate contained 96% of the vanadium content of the ore used as starting material. The sulfur content of the leached briquettes was well below 0.1%.

On account of the high compressive strength and the low sulfur content of the leached briquettes or lumps these are directly utilizable for charging a reduction furnace, e. g. a shaft furnace.

Since the heating step according to the invention is a sintering the process can suitably be combined with the process for making sinter common in the iron industry in such a way that ore concentrate is mixed with sodium sulfate before and leached with water after the common sinter process.

We claim:

1. Process for the recovery of vanadium from iron ore containing less than about 2% of vanadium calculated as $V_2O_5$ and for the simultaneous production of a sinter of the iron ore in lump form suitable for charging into a blast furnace which comprises mixing the iron ore with sodium sulfate in an amount corresponding to from 1 to 1.5 times the stoichiometric ratio with respect to the vanadium content of the ore, sintering the mixture under oxidizing conditions at a temperature within the range from 1000° C. to 1300° C., leaching the resulting sinter with water and precipitating the vanadium from the resulting leach solution.

2. A process as claimed in claim 1 in which the mixture of ore and sodium sulfate is briquetted before the sintering.

3. A process as claimed in claim 1 in which the vanadium values are precipitated from the leach solution by means of sulfuric acid, sodium sulfate thereby formed being recovered and recycled in the process.

References Cited in the file of this patent

UNITED STATES PATENTS

| | | |
|---|---|---|
| 19,991 | Gattman | Apr. 20, 1858 |
| 49,682 | Margulies | Aug. 29, 1865 |
| 831,280 | Handy | Sept. 18, 1906 |
| 1,428,616 | Stokes | Sept. 12, 1922 |
| 1,554,917 | Kunkle | Sept. 22, 1925 |
| 2,394,793 | Maier | Feb. 12, 1946 |
| 2,482,311 | Asok | Sept. 20, 1949 |